United States Patent [19]

Elleman et al.

[11] Patent Number: 4,840,496

[45] Date of Patent: Jun. 20, 1989

[54] NONCONTACT TEMPERATURE PATTERN MEASURING DEVICE

[75] Inventors: Daniel D. Elleman, San Marino; James L. Allen, La Crescenta, both of Calif.; Mark C. Lee, Rockville, Md.

[73] Assignee: The United States of America as represented by the Administrator of the National Aeronautics and Space Administration, Washington, D.C.

[21] Appl. No.: 159,613

[22] Filed: Feb. 23, 1988

[51] Int. Cl.[4] ............................. G01J 5/00; G01J 5/30
[52] U.S. Cl. ........................................ 374/124; 356/43; 374/126; 374/130
[58] Field of Search ............... 374/124, 126, 129, 130; 356/43, 45, 48

[56] References Cited

U.S. PATENT DOCUMENTS

| | | | |
|---|---|---|---|
| 3,462,224 | 8/1969 | Woods et al. | 356/43 |
| 3,745,830 | 7/1973 | Smith, Jr. | 374/128 |
| 3,941,923 | 3/1976 | Wheeler | 374/120 |
| 4,365,307 | 12/1982 | Tatsuwaki et al. | 364/557 |
| 4,403,251 | 10/1983 | Domareonk et al. | 364/557 |
| 4,413,324 | 11/1983 | Tatsuwaki et al. | 364/357 |
| 4,417,822 | 11/1983 | Stein et al. | 374/129 |
| 4,439,049 | 3/1984 | Hoogendoorn et al. | 374/124 |
| 4,516,864 | 5/1985 | Kim et al. | 374/130 |
| 4,557,607 | 12/1985 | Busse | 374/130 |
| 4,579,463 | 4/1986 | Rosencwaig et al. | 374/57 |
| 4,634,290 | 1/1987 | Rosencwaig et al. | 374/5 |
| 4,634,294 | 1/1987 | Christol et al. | 374/170 |
| 4,746,224 | 5/1988 | Mizuno et al. | 356/43 |

FOREIGN PATENT DOCUMENTS

| | | | |
|---|---|---|---|
| 2053650 | 4/1971 | France | 374/129 |
| 0076424 | 5/1982 | Japan | 374/124 |
| 0149927 | 9/1982 | Japan | 374/124 |
| 0049226 | 3/1987 | Japan | 356/43 |

OTHER PUBLICATIONS

Kasparov et al., "Photoemission Pyrometer", Instrum & Exp. Tech. (U.S.A.), vol. 24, No. 1 (8-81), pp. 208-211.

Wabon et al., "A New Scanning Thermometer", J. Phys. E.(GB), vol. 4, No. 12, (Dec. 1971) pp. 1029-1035.

Primary Examiner—William A. Cuchlinski, Jr.
Assistant Examiner—Thomas B. Will
Attorney, Agent, or Firm—Paul F. McCaul; Thomas H. Jones; John R. Manning

[57] ABSTRACT

Laser pyrometer techniques are utilized to accurately image a true temperature distribution on a given target without touching the target and without knowing the localized emissivity of the target. The pyrometer utilizes a very high definition laser beam and photodetector, both having a very narrow focus. The pyrometer is mounted in a mechanism designed to permit the pyrometer to be aimed and focused at precise localized points on the target surface. The pyrometer is swept over the surface area to be imaged, temperature measurements being taken at each point of focus.

7 Claims, 4 Drawing Sheets

NONCONTACT TEMPERATURE PATTERN MEASURING DEVICE

The invention described herein was made in the performance of work under a NASA contract, and is subject to the provisions of Public Law 96-517 (35 USC 202) in which the Contractor has elected not to retain title.

BACKGROUND OF THE INVENTION

1. Field of the Invention

The present invention relates generally to improvements in noncontact temperature pattern measuring devices and more prticularly pertains to new and improved temperature imaging systems utilizing active pyrometry techniques.

2. Description of the Prior Art

In the field of noncontact temperature pattern measuring devices, it has been the practice to employ passive pyrometry techniques to obtain the temperature image. Such devices have been unsatisfactory in that they provide true temperature images only if the local emissivity of the substance being measured is known. Failure to use the correct emissivity inevitably results in large measured temperature errors.

Examples of prior art imaging systems can be found in the U.S. Pat. Nos. issued to Tatsuwaki (4,365,307), Domarenok (4,403,251) and Tatsuwaki (4,413,344). All three of these patents are for imaging systems, but the pyrometry methods described for determining the temperature are that of two-color or multicolor passive pyrometry. A certain assumption must be made about the emissivity of the point of focus on the target: it is the same at the two (or more) different wavelengths. The Domarenok patent indicates the ability to compensate for varying emissivity across the target surface, but the constant emissivity with wavelength assumption still must be made for each point of focus. This assumption will be valid only for certain materials and temperature ranges, and as a result, can introduce large errors in the accuracy of the temperature measurement depending on the material used.

An example of active laser pyrometry used to measure the temperature of, a surface can be found in the Stein U.S. Pat. No. (4,417,822). The patent describes a system for noncontact measuring of the temperature of a body without knowing the emissivity. However, such measurement scheme is not shown as used in an imaging system.

The present invention provides a method for imaging a true temperature distribution on a given substance or target without physically having to touch the target and without knowing the localized emissivity of the target. According to the present invention, the foregoing and all the objects of the invention are attained by utilizing active pyrometry techniques in an imaging system.

SUMMARY OF THE INVENTION

A state of the art laser pyrometer incorporating a very high definition laser beam and photodetector, both with a narrow focus, are mounted on a mechanism that permits it to be aimed and focused at precise localized points on a target surface. The laser beam and photodetector mechanism is rapidly swept over the surface of the target. Temperature measurements are made at each point of focus. The assemblage of temperature measurements made in this manner provide a high resolution temperature profile for the scanned surfaces.

BRIEF DESCRIPTION OF THE DRAWINGS

The objects and many of the intended advantages of this invention will be readily appreciated as the same becomes better understood by reference to the following detailed description when considered in conjunction with the accompanying drawings in which like reference numerals designate like parts throughout the figures thereof and wherein.

DESCRIPTION OF THE PREFERRED EMBODIMENTS

BACKROUND DISCUSSION

Figure 1:
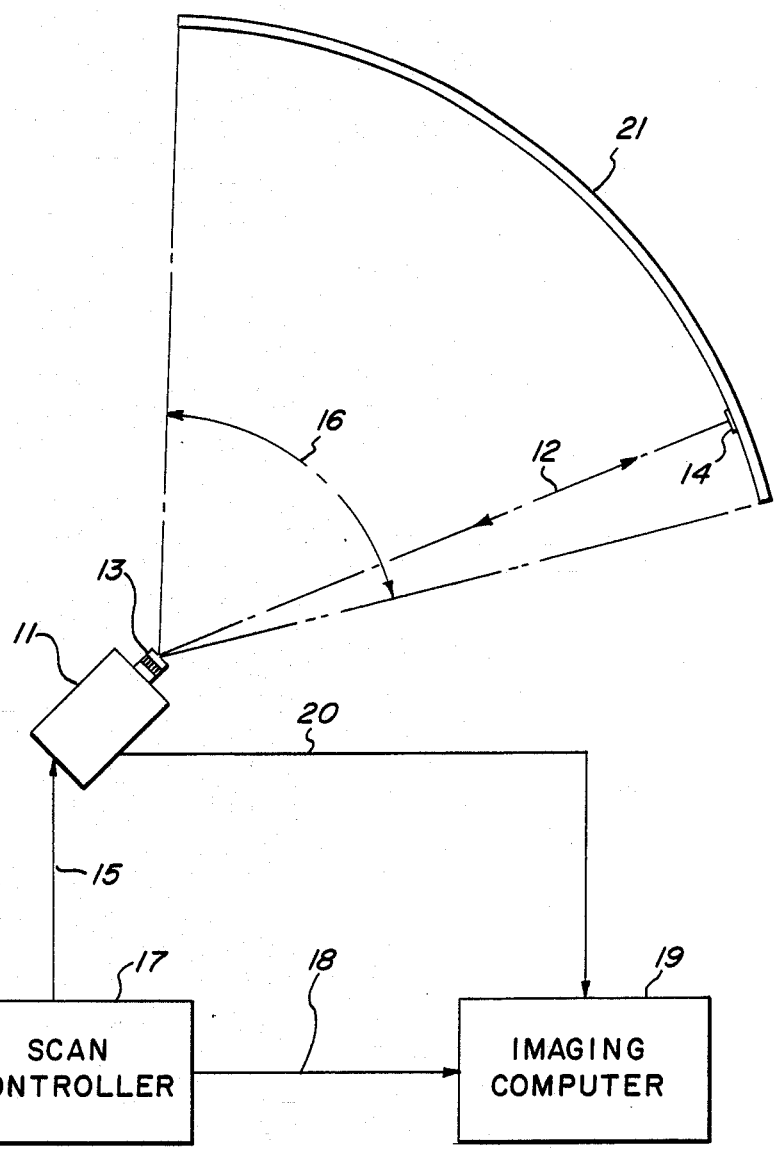
FIG. 1 is a schematic illustration of a preferred embodiment of the present invention utilized to provide a temperature image of a fixed target.

In the study and production of many materials, the physical contact required to make a conventional temperature measurement drastically effects or contaminates the physical process being observed. Two examples where accurate temperature profiles are of critical interest are:(1) the solid-liquid phase-change interface in the production of electronic materials; and (2) metastable materials in the undercooling region.

An understanding of the phase-change interface in the growth of semiconductor crystals is critical to the development of higher quality and more advanced electronic materials. A clear understanding of the temperature distribution at the crystal-melt interface is required. Unfortunately, a temperature probe placed in contact with a growing crystal at this interface could contaminate the melt and significantly alter the structure of the crystal as it is being formed.

In the production of metastable materials such as glasses and metallic glasses, knowledge of the temperature while the material is in the undercooling region is essential. However, if anything such as a temperature probe comes into contact with the melt while in the undercooling region, the probe could provide a nucleation site for crystal growth hhat would destroy the ability to maintain an undercooled state. A high resolution temperature map would provide great insight in the study of the nucleation and solidification phenomenon.

The problem is to provide a method for producing an accurate, true temperature image of a given substance in a contactless fashion without making assumptions about the localized emissivity of the substance or the uniformity of the temperature distribution. A means of measuring the radiance and emissivity at localized points on the substance surface is required in these instances.

There are presently several pyrometry methods by which a contactless temperature measurement may be obtained. The systems that use these methods fall into two general categories: passive and active systems.

Passive Pyrometry

The electromagnetic radiation emitted at a given wavelength, $\lambda$, from a surface is given by Planck's equation:

$$R(80) = (2hc^2/\lambda^5)\{\epsilon(\lambda,T)/[\exp(hc/\lambda kT)-1]\} \quad (1)$$

where $R(80)$ is the spectral radiance, $h = 6.63 \times 10^{31 \, 34}$ J.s is Planck's constant, $c = 3.00 \times 10^8$ m/s is the velocity of light, $\epsilon(\lambda,T)$ is the spectral emissivity, T is the temperature in Kelvin, and $k = 1.38 \times 10^{-23}$ J/molecule·K is Boltzmann's constant. In cases of interest, $\exp(hc/\lambda kT)$ is much greater than 1 and equation (1) reduces to Wien's equation:

$$R(\lambda) = (2hc^2/\lambda^5)[\epsilon(\lambda,T)/\exp(hc/\lambda kT)] \quad (2)$$

Let $2hc^2 = C_1$ and $hc/k = C_2$. Then equation (2) simplifies to:

$$R(\lambda) = (C_1/\lambda^5)[\epsilon(\lambda,T)/\exp(c_2/\lambda T)]. \quad (3)$$

Solving equation (3) for T, the true temperature of a target at wavelength, $\lambda$, is given by:

$$T = (c_2/\lambda)[\ln(C_1\epsilon(\lambda,T)/R(\lambda)\lambda^5)]^{-1}. \quad (4)$$

By definition, $\epsilon(\lambda,T) = 1$ for a blackbody at all wavelengths and temperatures. Thus, a relative temperature measurement can be readily obtained by assuming the target is a blackbody and passively measuring the radiation given off by the target using a photodetector with a narrow-band filter. Then equation (4) simplifies to:

$$T_b = (2/\lambda)[\ln(C_1/R(\lambda)\lambda^5)]^{-1}, \quad (5)$$

where $T_b$ is the blackbody, or "brightness" temperature. For brevity and clarity, $\epsilon$ and R will be used from this point to refer to $\epsilon(\lambda,T)$ and $R(\lambda)$, respectively. Rearranging equations (4) and (5):

$$1/T(C_2/\lambda) = \ln\epsilon + \ln(C_1/R\lambda^5) \quad (6) \text{ and}$$

$$1/T_b(C_2/80) = \ln(C_1/R\lambda^5). \quad (7)$$

By combining the two equations, and rearranging, equation (4) can be written in a different form:

$$T = [1/T_b + (\lambda/C_2)\ln\epsilon]^{-1}. \quad (8)$$

Then from equations (4) or (8), the true temperature can be calculated if the emissivity of the target is known, or if certain assumptions can be made about the emissivity to eliminate it from the equations. This is the basis of the passive single-color, multicolor, and sequential multicolor pyrometers. From equation (8) the true temperature, T, of the target will be equal to the brightness temperature, $T_b$, only if $\epsilon = 1$. If $\epsilon \neq 1$, then the true temperature will differ from the brightness temperature according to the emissivity term in equation (8). The accuracy of the true temperature will depend on how much the actual target emissivity differs from the value used in equations (4) or (8).

The right side of equation (4) contains two unknowns: the target emissivity, $\epsilon$, and the target radiance, R. The relative accuracy of the temperature, therefore, depends on the relative uncertainty of the emissivity and radiance:

$$\Delta T/T = [(\Delta\epsilon/\epsilon)^2 + (66\,R/R)^2]^{1/2}(\lambda T/C_2). \quad (9)$$

In the passive pyrometer systems, the radiance, R, can be measured quite accurately with the photodetector. Thus, the accuracy of the temperature depends on the uncertainty in the emissivity, which is the major shortcoming of the passive pyrometer systems.

In single color pyrometry, a guess at the emissivity must be made if it is not known a priori. Multicolor pyrometry uses a broad-band photodetector with two or more narrow-band filters to sample the target radiance at different wavelengths. If the emissivity is assumed to be independent of wavelength and temperature in the operating range of the pyrometer, the emissivity can be eliminated from the equations and the true temperature can be calculated. However, for many substances, the emissivity depends very strongly on temperature and wavelength, even over a narrow range. In these cases, the constant emissivity assumption is not valid and a large temperature error results.

It is apparent from equation (9) that for given errors in the emissivity and radiance, the temperature error can be minimized by making the wavelength as short as possible. This is the goal of all the passive systems. However, a short wavelength limits the working lower temperature limit of the pyrometer. The lower the temperature to be measured, the longer the wavelength of the photodetector filter that must be used.

Sequential multicolor pyrometers attempt to overcome this by using a different wavelength depending on the temperature range of the target. Each wavelength is selected to be insensitive to the emissivity for a given temperature band, and when several wavelengths are used, a wide temperature range can then be covered. This is the most advanced passive pyrometer system that is currently available. However, using a wavelength that is insensitive to the emissivity means operating the photodetector at a wavelength away from the radiance peak of the target. Obtaining a clean signal is difficult, since the signal-to-noise ratio is greatly decreased.

In all of these pyrometer systems, the target surface is treated as diffusive and a large area is sampled. However, imaging requires the ability to focus on a small, precise point on the target surface. The amount of radiation reaching the photodetector will be much less than before, and the signal-to-noise ratio will be even further decreased. As a result, all of the problems mentioned above for the passive pyrometer systems, will be compounded if such systems are adapted to high resolution temperature imaging.

Active Pyrometry

From examination of equation (4), the emissivity and radiance of the target must be measured to acquire an accurate true temperature of a given target. Current laser pyrometer systems augment the photodetector reading of the radiance by using a laser beam to make an active measurement of the target emissivity. As with the passive systems, the laser beam is expanded to cover a large area of the target surface and the surface is treated as diffusive. The system is calibrated with a target of known reflectivity, r, and thus, emissivity, since from Kirchhoff's Law, $\epsilon = 1 - r$.

For example, consider a calibration target of known reflectivity $r_{c1}$, yielding a calibration reference signal, $V_{c1}$. The emissivity of the real target can then be calculated: $\epsilon_{tl} = 1 - (V_{tl}/V_{cl})r_{cl}$ where $V_{tl}$ is the returned laser signal from the target.

The laser pyrometer also uses a photodetector that is highly linear over the entire operating temperature range to measure the radiance signal of the target, $V_{tr}$. The overall system constant, $k_1$, is obtained by passively measuring the radiance of a blackbody furnace (emissivity = 1.0) at an arbitrary, known temperature. The target radiance signal and system constant are equivalent to the radiance and constants in equation (4):

$$k_1 V_{tr} = C_1/R(\lambda)\lambda^5. \tag{10}$$

Thus, the true temperature of the target can be computed:

$$T(K) = (C_2/\lambda)[\ln(\epsilon_{tl}/k_1 V_{tr})]^{-1} \tag{11}$$

True Temperature Imaging By Laser Pyrometry

The active laser pyrometer technology of the prior art and specifically, the laser radiometer systems disclosed in U.S. Pat. No. 4,417,822 issued on Nov. 29, 1983 to Alexander Stein, et al. is utilized in the present invention as part of the true temperature imaging system of the present invention. The disclosure of the Stein patent is incorporated by reference herein. It is important to emphasize that the uniqueness of a noncontact true temperature imaging system lies in the incorporation and adaptation of active laser pyrometer technology to imaging systems.

Rather than treating the target as diffusive, as does Stein, the temperature imaging pyrometer for use in the present imaging system uses a very high resolution laser beam and photodetector, both of which can be focused on a very small precise point on the target surface. These devices are readily available and therefore will not be further described herein. Employing a laser wavelength of 1.3 $\mu$m and assuming a temperature in the range of 1300° C. with a signal to noise ration of 10, the current laser technology can provide a scanning rate of up to 100,000 pixels per second with spatial and differential temperature resolutions of $10 \times 10$ $\mu m_2$ and 1° K, respectively.

As is inherent in each passive pyrometer system, problems in trying to make a clean measurement of the radiance from a localized point on the target surface can arise. However, since the target emissivity is measured, as described for the Stein active laser pyrometer, longer wavelengths can be used and still maintain acceptable accuracy in the temperature value. Longer wavelengths allow the radiance to be sampled with an improved signal-to-noise ratio, offering an improvement over the passive pyrometer systems.

Because the target is no longer considered diffusive, specular reflection of the laser beam and photodetector placement must be considered. Because in most applications the target surface curvature (target shape) will be known, the reflection of the laser beam and photodetector placement can be easily ascertained. Even in the case where a semiconductor crystal is grown and temperature monitoring of the liquid is desired, the crystal can be grown in a transparent (to the laser beam and photodetector) cylindrical crucible that will force the melt into a well-defined shape.

Another consideration for the design of a system is the ability to change the point of focus of both the laser and the photodetector so that a variety of points on the target surface can be measured for temperature. This focus scanning must be done rapidly in order to produce a meaningful temperature map in a dynamic system.

Because of the above considerations, all of the figures presented illustrate not only different embodiments of a scanning subsystem, but ways in which this subsystem must be designed so that the device as a whole is able to produce an accurate temperature image of a given target. The scanning subsystem must allow the pyrometer and optics subsystems to be properly focused at each point of interest on the target surface, as well as carefully control the angle of incidence and reflection for the laser beam so that target specularity and shape do not produce errors in the temperature image.

FIG. 1 illustrates a preferred embodiment of a system incorporating the above requirements wherein a laser pyrometer 11 having a lens assembly 13 is pointed at a target 21. Target 21 is a special type of target having a large concave surface. Such a surface has the characteristic that it reflects the laser beam back to approximately the same spacial location from any point on its surface. A laser beam 12 would, when so directed, strike focus point 14 and be reflected back from focus point 14 through lens assembly 13 to the pyrometer 11 for processing in the same way that another laser beam (not shown) is directed to another point (not shown) on target 21 and reflected back to lens assembly 13. The lens assembly 13 has a field of view 16 which encompasses the entire target 21. Target 21 has a length and width. Only its length is shown in FIG. 1.

In order to provide a temperature profile of the target 21 without moving laser pyrometer 11 or the lens assembly 13, the focus of the laser and photodetector in pyrometer 11 must be electronically swept across the surface of the target 21. Since the target is a large concave surface and the focal point and the distance from every point on its surface to the lens assembly is the same, electronically sweeping the surface of target 21 is possible. This is accomplished in a well-known manner by electronically sampling segments of the photodetector in laser pyrometer 11 that coincide with various spots on target 21. For example, a specific photodetector segment in pyrometer 11 would correspond with target area 14.

Scan control logic 17 would direct the electronic sampling of the outputs of the photodetectors in pyrometer 11 over control lines 15 at the same time as it supplies information over line 18 to imaging computer 19 regarding the focus point location of the output signal being supplied over lines 20. Imaging computer 19, a processor of any well-known type, would take the information supplied to it over lines 20 and 18, calculate the true temperature of the particular spot on target 21 being sampled, and correlate that temperature reading to its spacial parameters.

Figure 2:
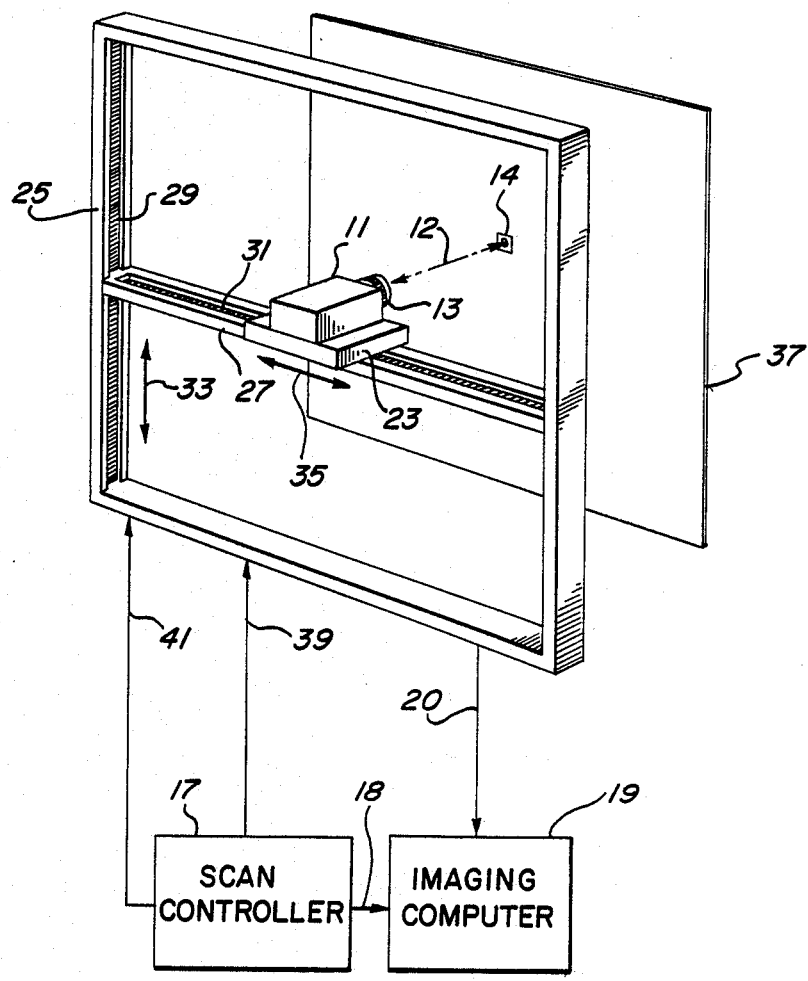
FIG. 2 illustrates an altnate preferred embodiment in pictorial and block form when a fixed or moving target is mechanically scanned.

For those situations where the target surface does not have this special characteristic, a large concave surface, but is, for example, flat like target 37 in FIG. 2, a different scanning system must be used. In such situations, the laser pyrometer 11 and its lens assembly 13 must be physically swept across the surface of the fixed target 37, focusing on a plurality of different focus points 14 on the surface of the target 37 in order to acquire the temperature measurements for the temperature profile generated by the imaging computer 19.

A mechanism for accomplishing the mechanical scanning of the pyrometer 11 is a mechanical servo system 25. The servo system 25 is capable of moving pyrometer 11 in an X direction 35 and a Y direction 33. The servo system 25 is aligned with respect to the target 37 so that the distance from the surface of every point 14 on the surface of the target 37 to the lens structure 13 of the pyrometer 11 is as equal as possible.

The mechanical servo system 25 is constructed so that a mounting platform 23 is movably mounted on a support member 27, movement being back and forth along the X direction 35 by way of a screw mechanism 31, for example, which is driven by servo motors in a well-known manner. Support member 27 is in turn mounted to be moved, in the Y direction 33 along with the support platform 23 that is movably mounted to it. Pyrometer structure 11 is mounted on the support platform 23. Movement is, again, by means of a screw mechanism 29 driven by servo motors in a well-known manner.

By controlling the servo motors driving the Y direction screw 29 and the X direction screw 35, the laser beam 12 and the focus of the photodetector on the target can be directed to scan the surface of target 37 in any pattern. For example, from the upper left-hand corner to the lower right-hand corner at an angle can be scanned if the servo motors driving the Y screw 29 and the servo motors driving the X screw 35 are moving at the same rate.

A scanning pattern to be followed by the mechanical servo mechanism can be selected according to the temperature image required from target 37. If a complete temperature distribution of the entire surface of target 37 is desired, the pyrometer 11 should scan across the face of the target from left to right, for example, drop down and scan another line just as if the target were a page and the laser pyrometer 11 were reading the page.

The mechanical servo motors (not shown) driving the Y direction screws 29 and the X direction screw 35 are controlled by a scan controller 17 over input lines 39 and 41. At the same time that scan controller 17 is providing control signals to the servo motors it is providing position information signals to imaging computer 19 over lines 18. Besides these signals, scan controller 17 can advantageously provide focusing information to the pyrometer lens assembly 13, as needed, to insure that the lens system is focused at each point.

Imaging computer 19 receives the measured parameters sensed by the pyrometer photodetectors (not shown) in pyrometer 11 over lines 20, as well as the spacial information from the scan control 17 over lines 18. Imaging computer 19, in a well-known manner, calculates the true temperature of each individual focus point, using the equations set forth above. Then it associates the calculated temperature with the spacial information and provides the temperature profile of the target 37.

Figure 3:
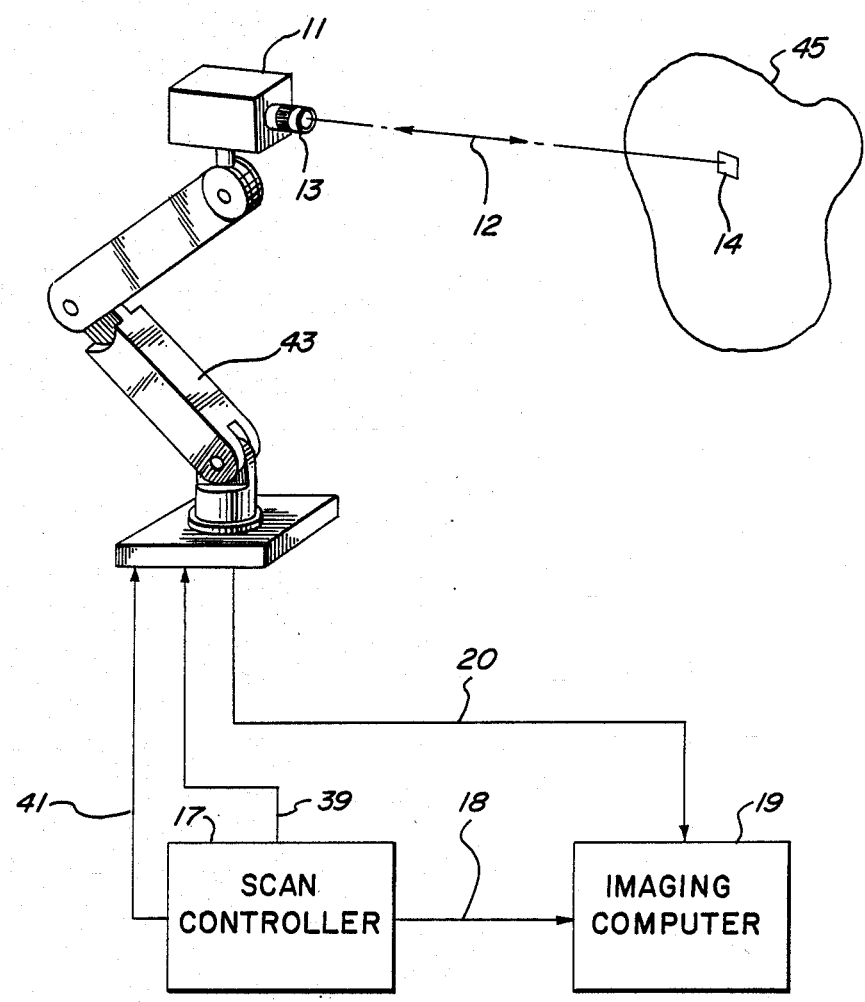
FIG. 3 is a block and pictorial illustration of an alternate preferred embodiment of the present invention wherein a fixed target is mechanically scanned.

Not every situation is amenable to this type of servo imaging system. In the instance where the target is an arbitrary, but known shape, where the surface varies in three dimensions, imaging according to the present invention can best be accomplished by a mechanical servo system which is essentially a robot arm 43 (FIG. 3). The arm 43 carries the pyrometer 11 and lens structure 13. The robot arm, as is well-known, can move in three dimensions in the X, Y and Z directions—in one direction at a time, in two directions at a time, or in three directions at a time. In this manner, the arm can be commanded by scan controller 17 to sweep the pyrometer focus across a target 45 having varying surface while always keeping the laser and the photodetector properly focused on the small point 14 presently having its temperature measured. The scan controller 17 and the imaging computer 19 operate in the manner previously discussed in connection with the imaging systems of FIGS. 1 and 2.

Figure 4:
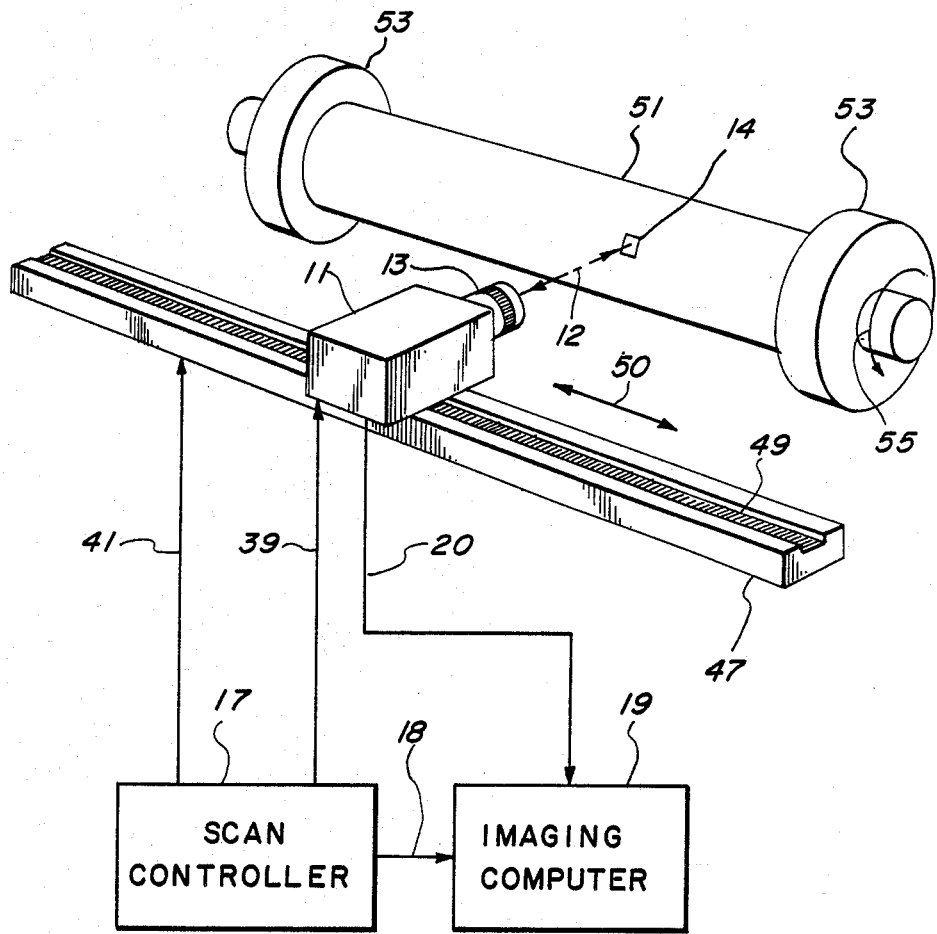
FIG. 4 is a block and pictorial diagram of the preferred embodiment of the present invention wherein a moving target is mechanically scanned.

In those situations where the target has a symmetry, the present invention can take advantage of such symmetry in the manner shown in FIG. 4. A semiconductor crystal melt in a cylindrical crucible, for example, could be the target 51. The crucible is rotated along its symmetrical access in a preferred direction 55 by appropriate holding and rotating mechanisms 53.

To provide a temperature image of the complete surface of the target 51, the pyrometer 11 with its lens assembly 13 is mounted for movement on a travel assembly 47 by means of a drive screw mechanism 49, for example. The travel assembly 47 is placed essentially parallel to the symmetrical access of target 51 so that movement along travel assembly 47 in directions 50 causes the pyrometer 11 to traverse the length of the target 51.

Scan controller 17 supplies positional information to the drive mechanism 49 to place pyrometer 11 as desired. At the same time, it supplies the positional information over lines 18 to imaging computer 19. Scan controller 17 may also be providing focusing information to lens assembly 13 of the pyrometer 11 so that the laser beam and photodetector mechanisms of the pyrometer are focused on the individual spots 14 of the laser target, as the target is rotated and as the laser pyrometer is moved in the directions 50. Imaging computer 19 receives the appropriate measured information from the pyrometer 11 and positional information from scan controller 18. It utilizes this information to calculate the true temperature of each spot 14 accordingly measured and associates it with the positional information to provide the temperature profile.

What has been described is a true temperature imaging system which utilizes laser pyrometer techniques so that a true temperature image of a given target can be ascertained without touching the target and without knowing the localized emissivity of the target.

Various modifications are contemplated and they obviously will be resorted to by those skilled in the art without departing from the spirit and scope of the invention as hereinafter defined by the dependent claims since only preferred embodiments thereof have been disclosed.

What is claimed is:

1. A noncontact temperature pattern measuring device for providing the true temperature distribution for a remotely located surface area, said measuring device comprising:

a laser pyrometer means including a high resolution photodetector positioned to receive thermal radiation from said remotely located surface area, a high resolution laser for eradiating a portion of said remotely located surface, and means for detecting at least a portion of the laser signal reflected from said remotely located surface for determining the emissivity of the surface region reflecting the laser signal and compensating the value of thermal radiance for said emissivity;

means for focusing the laser signal, the response of the photodetector to thermal radiation and the response of the laser signal detecting means on a small precise point on the remotely located surface area; and means for scanning the focused condition created by said focusing means across the entire remotely located surface area, thereby producing a true temperature measurement at each point of focus.

2. The noncontact temperature pattern measuring device of claim 1 wherein said means for focusing comprises an optical lens system.

3. The noncontact temperature pattern measuring device of claim 2 wherein said scanning means comprises means for electronically scanning the focus of the focusing means through the field of view of the optical lens system.

4. The noncontact temperature pattern measuring device of claim 2 wherein said scanning means comprises means for moving the laser pyrometer along two perpendicular directions of travel, at the same time or along one direction at a time.

5. The noncontact temperature pattern measuring device of claim 2 wherein said scanning means comprises means for moving the laser pyrometer along three perpendicular directions of travel at the same time, along one direction of travel at a time, or along any two perpendicular directions of travel at a time.

6. The noncontact temperature pattern measuring device of claim 2 wherein said scanning means comprises means for moving the laser pyrometer along one direction of travel.

7. The noncontact temperature pattern measuring device of claim 2 wherein said remotely located surface area is symmetrical and being rotated about its central axis; and said scanning means comprises means for moving the laser pyrometer along one direction of travel parallel to the central axis of rotation of the remotely located surface area.

* * * * *